(12) United States Patent
Mahaffey

(10) Patent No.: US 11,521,760 B1
(45) Date of Patent: Dec. 6, 2022

(54) HELIUM FLOW STOP ASSEMBLY (HFSA) FOR TIG WELDING PROCESS OF NUCLEAR FUEL RODS

(71) Applicant: Westinghouse Electric Company LLC, Cranberry Township, PA (US)

(72) Inventor: Charles M. Mahaffey, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 43 days.

(21) Appl. No.: 17/324,981

(22) Filed: May 19, 2021

(51) Int. Cl.
  *B23K 9/16* (2006.01)
  *G21C 21/02* (2006.01)
  *B23K 31/02* (2006.01)
(52) U.S. Cl.
  CPC .............. *G21C 21/02* (2013.01); *B23K 9/164* (2013.01); *B23K 31/02* (2013.01)

(58) Field of Classification Search
  CPC ........ B23K 9/028; B23K 9/164; B23K 31/02; G21C 21/02
  See application file for complete search history.

(56) References Cited

U.S. PATENT DOCUMENTS 4,857,691 A * 8/1989 Boatwright ............ B23K 9/028
  219/60 R

* cited by examiner

*Primary Examiner* — Lee A Holly
(74) *Attorney, Agent, or Firm* — K&L Gates LLP

(57) ABSTRACT

An assembly configured to seal an end plug on a plugged end of a fuel tube is disclosed. The assembly includes a seal weld chamber assembly and a helium flow stop assembly (HFSA) removably coupled to the seal weld chamber assembly. The seal weld chamber assembly includes a welding chamber and a plunger fluidically coupled to the welding chamber. A helium source is configured to supply helium to the welding chamber. The end plug of the fuel tube is positionable within the welding chamber via the plunger. The HFSA is configured to prevent helium from escaping the welding chamber through the plunger.

20 Claims, 5 Drawing Sheets

US 11,521,760 B1

HELIUM FLOW STOP ASSEMBLY (HFSA) FOR TIG WELDING PROCESS OF NUCLEAR FUEL RODS

BACKGROUND

This invention relates generally to seal welding chamber assemblies that are configured to seal end plugs installed into the open ends of fuel rods

SUMMARY

In various embodiments, an assembly configured to seal an end plug on a plugged end of a fuel tube is disclosed. The assembly includes a seal weld chamber assembly and a helium flow stop assembly (HFSA) removably coupled to the seal weld chamber assembly. The seal weld chamber assembly includes a welding chamber and a plunger fluidically coupled to the welding chamber. A helium source is configured to supply helium to the welding chamber. The end plug of the fuel tube is positionable within the welding chamber via the plunger. The HFSA is configured to prevent helium from escaping the welding chamber through the plunger.

In various embodiments, an assembly configured to seal an end plug on a plugged end of a fuel tube is disclosed. The assembly includes a seal weld chamber assembly and a helium flow stop assembly (HFSA). The seal weld chamber assembly includes a welding chamber and a plunger fluidically coupled to the welding chamber. A helium source is configured to provide helium to the welding chamber. The end plug of the fuel tube is positionable within the welding chamber via the plunger. The HFSA includes a housing removably coupled to the seal weld chamber assembly and a sealing assembly coupled to the housing. The sealing assembly is configured to seal the plunger to inhibit ambient atmosphere from entering the welding chamber via the plunger.

In various embodiments, a helium flow stop assembly (HFSA) usable with a seal weld chamber assembly is disclosed. The seal weld chamber assembly includes a welding chamber, a helium supply configured to supply helium to the welding chamber, and a plunger fluidically coupled to the welding chamber. The HFSA includes a housing configured to removably couple to the seal weld chamber assembly, an arm assembly coupled to the housing, and an arm assembly actuator. The arm assembly includes a seal configured to engage the plunger. The arm assembly actuator is configured to move the seal relative to the housing.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

In nuclear power generating systems, a nuclear reactor is utilized for the production of electrical energy. A primary side of the reactor comprises a reactor vessel enclosing a core internal structure that supports a plurality of fuel assemblies containing fissile material. The fuel assembly can include an array of elongated fuel rods transversely spaced and supported within the reactor.

Nuclear fuel rods are assembled using several components and operations prior to being placed into the array. A fuel rod consists of a precision tube that is loaded with reactive fissile material, which is responsible for creating the reactive power of the reactor. The fissile material is in the form of cylindrical pellets that are stacked inside of the fuel tube. After the pellets have been loaded into the tube, end plugs are put into place at the open-ends of the tube, forming a fuel rod.

The fuel tube plugging process consist of pressing plugs into the open-ends of the loaded tube. The tubes then undergo a welding process to secure these plugs into the rod. The welding process requires a circumferential weld and sealing weld, girth weld and seal weld respectively. The first operation is the girth weld that secures the end plug into the tube, followed by the seal weld that seals an orifice that exists in the end plug. The seal weld ensures that helium that is placed into the fuel rod to evacuate contaminates remains pressurized and therefore sealed.

Figure 1:
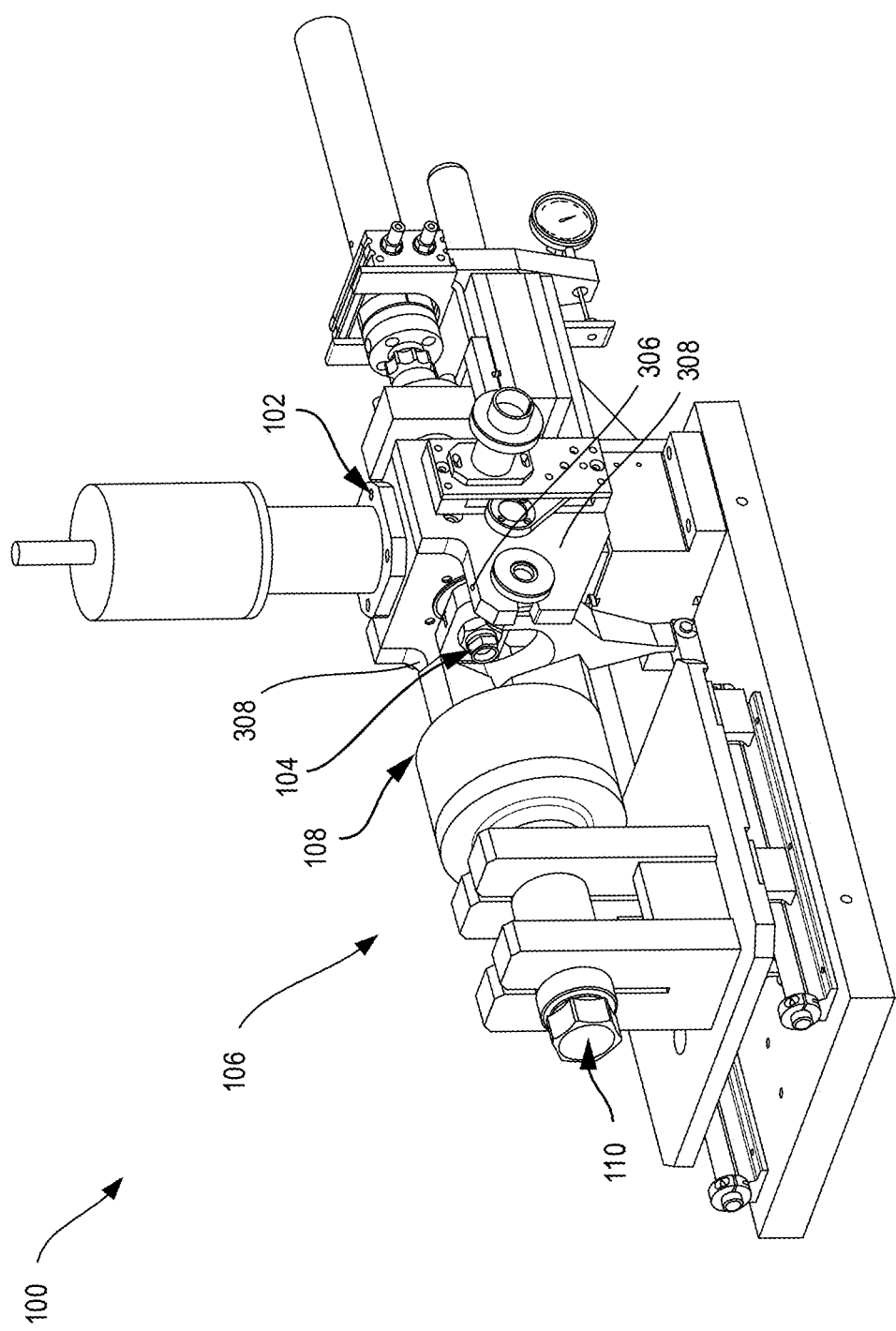
FIG. 1 illustrates a seal weld chamber assembly, according to at least one aspect of the present disclose.

To accomplish the seal weld, a seal weld chamber assembly is utilized. Referring to FIG. 1, a seal weld chamber assembly 100 is provided in accordance with at least one aspect of the present disclosure that can be used to seal the end plugs of the fuel tubes. The seal weld chamber assembly 100 can include a welding chamber 102, a plunger 104 fluidically coupled to the welding chamber 102 and open to ambient atmosphere, and a rod grasping assembly 106 including a chuck 108. In operation, the plugged end of the fuel rod including the end plug can be fed through a rod entrance aperture 110 of the grasping assembly 106, through the chuck 108, through the plunger 104, and into the welding chamber 102. Once the end plug of the fuel rod is positioned within the welding chamber 102, the chuck 108 of the rod grasping assembly 106 can be tightened to grasp the fuel rod to maintain a position of the fuel rod relative to the welding chamber 102. In the welding chamber 102, a welding process, such as with TIG welding process, can occur to seal the end plugs of the fuel rods.

In order to maintain a sterile environment within the welding chamber 102, a shield gas is provided to the welding chamber 102 that prevents the ambient environment from entering the welding chamber 102 via the plunger 104. In one aspect, the shield gas can comprise helium and the helium can be supplied to the welding chamber 102 from a helium source fluidically coupled to the welding chamber 102. Owing to the open plunger 104, illustrated in FIG. 1, a constant flow of helium to the welding chamber 102 is required regardless of rod line status to keep the ambient atmosphere from entering the welding chamber 102, ensuring a contaminate-free environment at the welding chamber 102. In the event atmosphere enters the welding chamber 102 through the plunger 104, a burn-out process must be performed to eliminate contaminates from the welding chamber 102, thus interrupting rod line operations. The resulting ramification of having a constant open plunger 104 is that a costly commodity of helium is constantly vented to the atmosphere at the rate of 12 ft$^3$/hr (6 LPM).

With reduced availability and subsequent rising costs of helium, there is a need to reduce the usage of helium supplied the welding chamber 102. There is also a need to preserve the integrity and sterility of the welding chamber 102 by not allowing ambient atmosphere to enter the welding chamber 102 via the plunger 104, as well as not allowing the helium in the welding chamber 102 to escape via the plunger 104.

Figure 2:
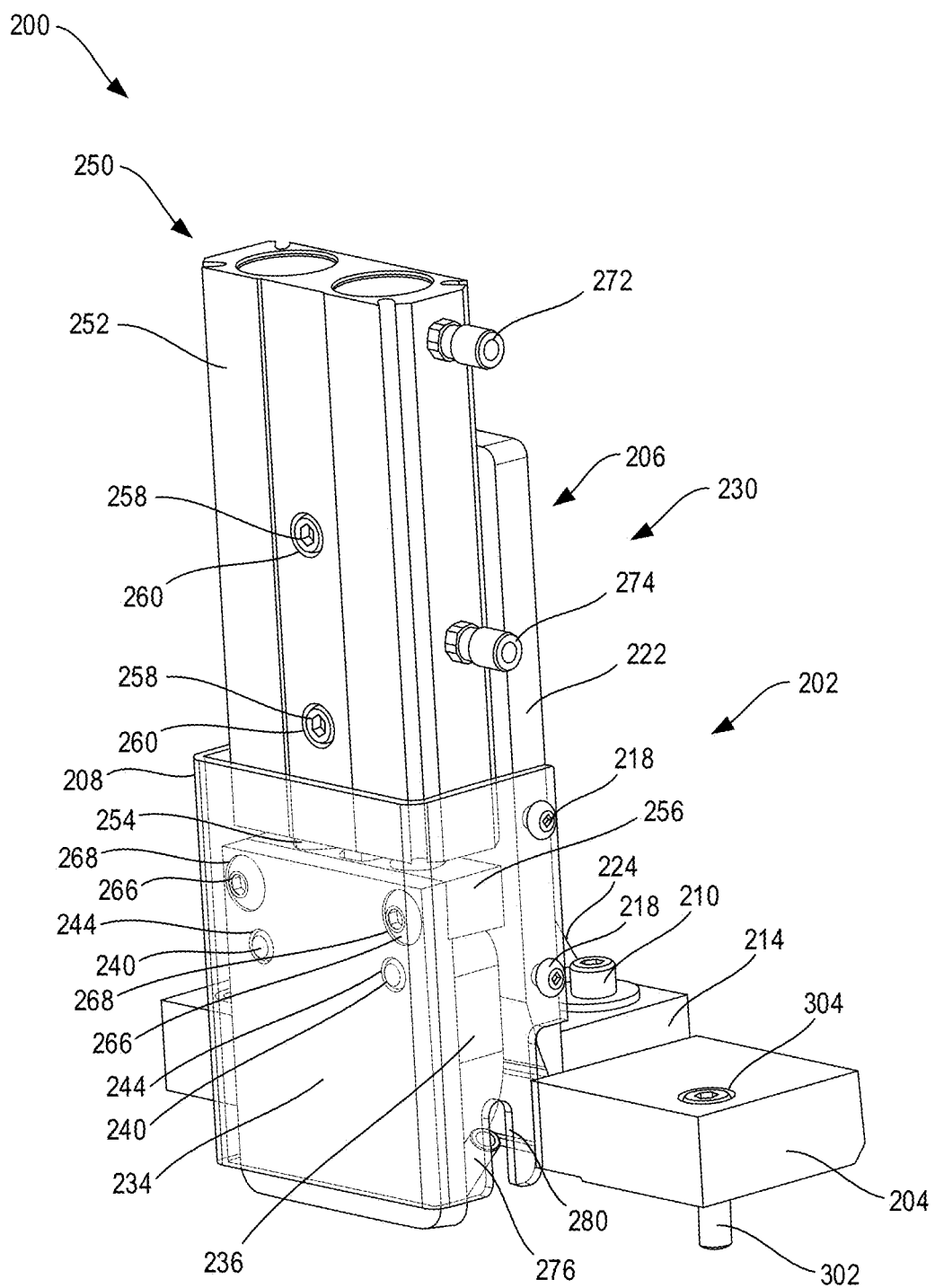
FIG. 2 illustrates a helium flow stop assembly (HFSA), according to at least one aspect of the present disclosure.
Figure 3:
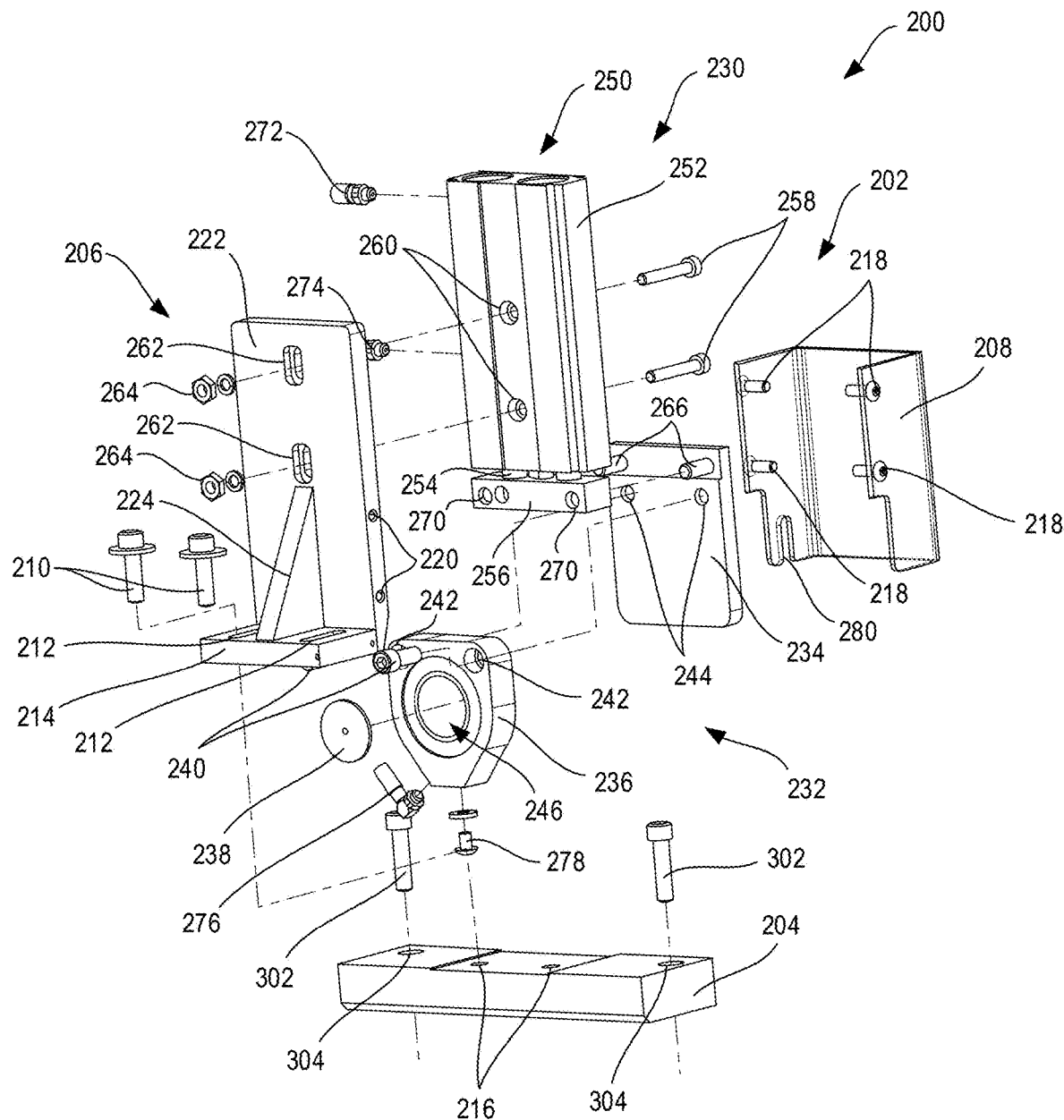
FIG. 3 illustrates an exploded view of the HFSA of FIG. 2, according to at least one aspect of the present disclosure.

Referring now to FIGS. 2 and 3, a helium flow stop assembly (HFSA) 200 is provided, according to at least one aspect of the present disclosure. In one aspect, the HFSA 200 comprises a housing assembly 202 and a sealing assembly 230 coupled to the housing assembly 202.

In various embodiments, the housing assembly 202 comprises a mounting flange 204, a support structure 206, and a guard 208. The support structure 206 is mountable to the mounting flange 204 using fasteners 210 that extend through slots 212 defined in a base 214 of the support structure 206 and couple to mounting holes 216 defined in the mounting flange 204. In one aspect, the slots 212 can define tracks that allow the support structure 206 to be positionable relative to the mounting flange 204 in a plurality of positions before securing the support structure 206 to the mounting flange 204 with the fasteners 210.

In one aspect, the guard 208 is mountable to the support structure 206 using a plurality of fasteners 218. The fasteners 218 extend through mounting holes defined in the guard 208 and couple to mounting holes 220 defined in lateral sides of a backer plate 222 of the support structure 206 (only two of the mounting holes 220 shown in FIG. 3). The guard 208 provides protection for a user of the HFSA 200 by minimizing pinch points, as well as allows a user to view various internal components of the housing assembly 202 while the HFSA 200 is in use, as will be described in more detail below. The support structure 206 further includes a brace 224 coupled to the base 216 and the backer plate 222 to provide structural support for resulting forces from seal engagement, as will be discussed in more detail below, as well as providing support to the support structure 206.

In one aspect, the sealing assembly 230 comprises an arm assembly 232 and an arm assembly actuator 250. The arm assembly 232 comprises a plate 234, a seal actuator 236, and a seal 238. The seal actuator 236 is mountable to the plate 234 using fasteners 240 that extend through mounting holes 242 defined in the seal actuator 236 and couple to mounting holes 244 defined in the plate 234. In various embodiments, mounting hardware, such as nuts and fasteners 240, can be used to mount the seal actuator 236 to the plate 234. The seal actuator 236 defines a chamber 246 that is sized to receive and hold the seal 238 therein.

In various embodiments, the arm assembly actuator 250 comprises a mounting canister 252 and a piston 254 including a mounting head 256. The mounting canister 252 is mountable to support structure 206 using fasteners 258 that extend through mounting holes 260 defined in the mounting canister 252 and mounting holes 262 defined in the backer plate 222 of the support structure 206 and couple to mounting features 264, such as nuts, thereby retaining sealing assembly 230 relative to the housing 202. The plate 234 is mountable to the piston 254 using fasteners 266 that extend through mounting holes 268 defined in the plate 234 and couple to mounting holes 270 defined in the mounting head 256 of the piston 254. In various embodiments, mounting hardware, such as nuts and fasteners 266, can be used to secure the plate 234 to the mounting head 256.

In one aspect, the arm assembly actuator 250 can move the arm assembly 232 relative to the housing assembly 202. In various embodiments, the arm assembly actuator 250 can move the arm assembly 232 between a retracted position and an extended position. In the retracted position, illustrated in FIG. 2, the piston 254 is retracted within the mounting canister 252 and the arm assembly 232 is positioned within, or at least substantially within, the housing assembly 202, adjacent to the guard 208. In the extended position, illustrated in FIG. 5, the mounting head 256 of the piston 254 is extended away from mounting canister 252 such that arm assembly 232 is positioned outside and away from the housing assembly 202. In one aspect, the arm assembly actuator 250 can comprise a pneumatic actuator such that the arm assembly 232 is pneumatically drivable between the retracted position and the extended position. In various embodiments, the arm assembly actuator 250 can comprise an upper pneumatic input 272 and a lower pneumatic input 274 coupled to the mounting canister 252. In one aspect, when air is supplied to the upper pneumatic input 272, the mounting head 256 of the piston 254 is driveable away from the mounting canister 252 to move the arm assembly 232 toward the extended position. In one aspect, when air is supplied to the lower pneumatic input 274, the mounting head 256 of the piston 254 is driveable toward the mounting canister 252 to move the arm assembly 232 toward the retracted position.

In one alternative embodiment, the arm assembly actuator 250 includes one pneumatic input such that, when air is supplied to the one pneumatic input, the arm assembly 232 is driven toward the extended position. When air is not supplied to the pneumatic input, a biasing mechanism can bias the arm assembly 232 toward the retracted position (i.e., fail open configuration). In another alternative embodiment, the arm assembly actuator 250 includes one pneumatic input such that, when air is supplied to the one pneumatic input, the arm assembly 232 is driven toward the retracted position. When air is not supplied to the pneumatic input, a biasing mechanism can bias the arm assembly 232 toward the extended position (i.e., fail closed configuration). In various alternative embodiments, the arm assembly actuator 250 can comprise a motor-driven actuator that includes a motor that can drive the arm assembly 232 between the extended position and the retracted position.

In one aspect, the seal 238 of the arm assembly 232 can be configurable between an engaged configuration and a disengaged configuration. In the engaged configuration, the seal actuator 236 can cause the seal 238 to extend from the chamber 246 such that the seal 238 can engage a component positioned adjacent thereto, as will be described in more detail below. In the disengaged configuration, the seal actuator 236 can cause the seal 238 remain in the chamber 246 and disengaged from components positioned adjacent to the seal 238.

In various embodiments, the seal actuator 236 can comprise a pneumatic input 276 that can supply air to the seal actuator 236 and drive the seal 238 toward the engaged configuration, such as from the disengaged configuration. In various embodiments, the seal 238 can be driven toward the disengaged position by back pressure applied to the seal 238 from the welding chamber 102 via the plunger. In various embodiments, the guard 208 can define a notch 280 that can be positioned adjacent to the pneumatic input 276 when the HFSA 200 is assembled, as shown in FIG. 2. The notch 280 in the guard 208 allows instrument tubing to reach and couple to the pneumatic input 276 when the HFSA 200 is assembled and the arm assembly 232 is in the retracted position.

Various alternative embodiments are envisioned where the seal actuator 236 comprises two pneumatic inputs, one which drive the seal 238 toward the engaged configuration and one which drives the seal 238 toward the disengaged configuration, similar to the upper pneumatic input 272 and the lower pneumatic input 274. In one aspect, the seal actuator 236 can include a plug 278 that can plug pre-existing orifices in the seal actuator 236 to maintain the pressure within the seal actuator 236 during use.

Figure 4:
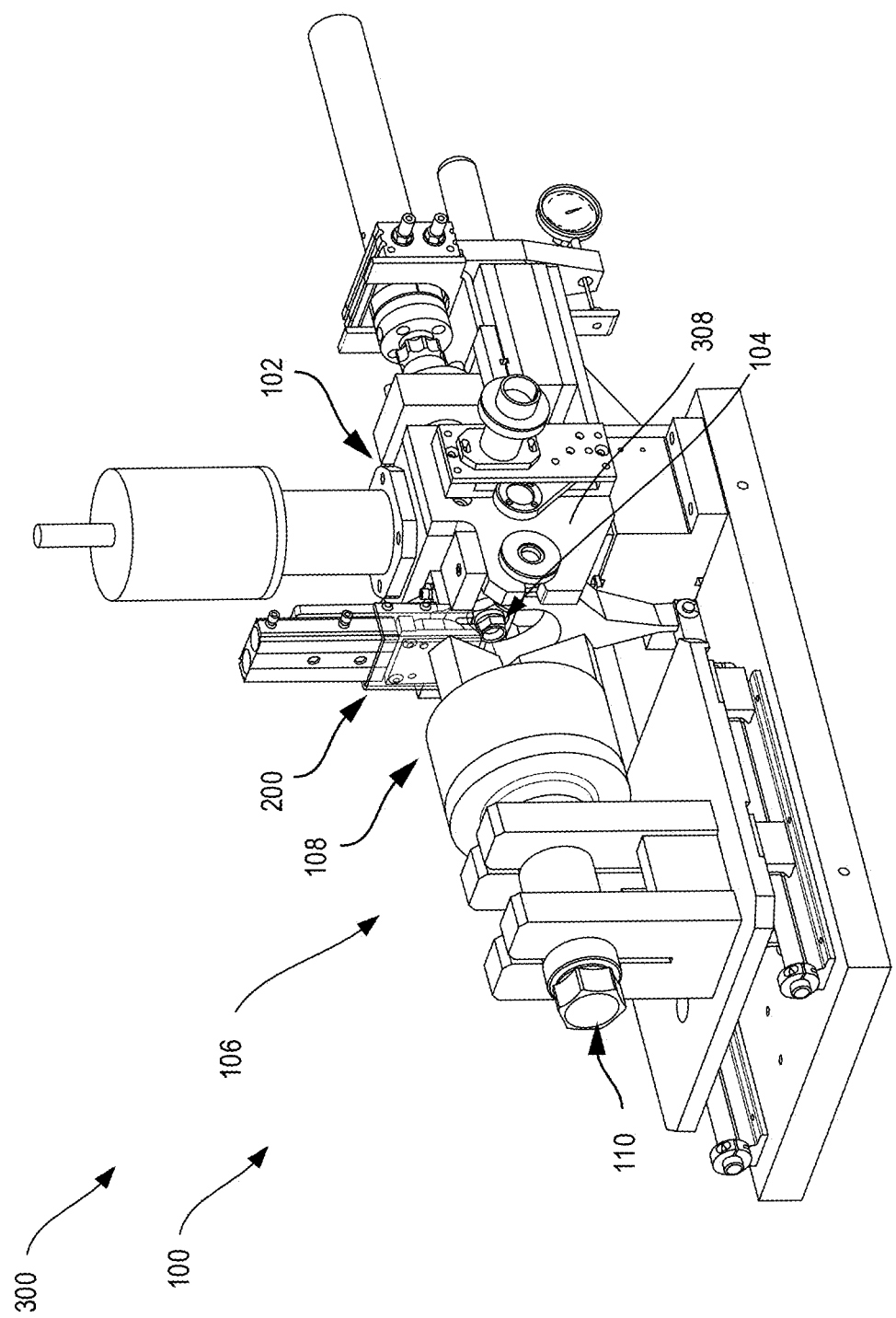
FIG. 4 illustrates the HFSA of FIG. 2 coupled to the seal weld chamber assembly of FIG. 1, according to at least one aspect of the present disclose.

Having described the various components of the HFSA 200, the disclosure now turns to the functionality of the HFSA 200 in connection with the seal weld chamber assembly 100, discussed above. Referring now to FIG. 4, an assembly 300 is provided, according to at least one aspect of the present disclosure. The assembly 300 includes the HFSA 200 coupled to the seal weld chamber assembly 100, illustrated in FIG. 1. The HFSA 200 can be coupled to the seal weld chamber assembly 100 using fasteners 302 that can extend through mounting holes 304 defined in mounting flange 204 and that can couple to mounting holes 306 defined in support arms 308 positioned adjacent to the welding chamber 102 and the plunger 104 of the seal weld chamber assembly 100.

As described above, helium can be supplied to the welding chamber 102 from a helium source to prevent ambient environment from entering the welding chamber 102 via the plunger 104. An end plug on a plugged end of the fuel tube can be fed into the welding chamber 102 via the plunger 104 to weld the orifice that exists in the end plug end using a seal welding process. Once welded, the fuel tube can be removed from the welding chamber 102 via the plunger 104.

Once removed from the plunger 104, the HFSA 200 can seal the plunger 104, thereby preventing the ambient environment from entering the welding chamber 102 and preventing the helium from escaping the chamber, thus allowing the constant flow of helium to the welding chamber 102 to be halted. Halting the flow of helium saves the amount helium that the seal weld chamber assembly 100 requires to properly maintain the inert atmosphere thereof.

In operation, when the fuel rod exits the welding chamber 102 and the plunger 104, the HFSA 200 can be actuated to seal the plunger 104. In one aspect, the HFSA 200 can be actuated by manual input from a user. In another aspect, the HFSA 200 can be automatically actuated by a control system that includes a sensor that can detect when the fuel rod is removed from the welding chamber 102 and the plunger 104.

Figure 5:
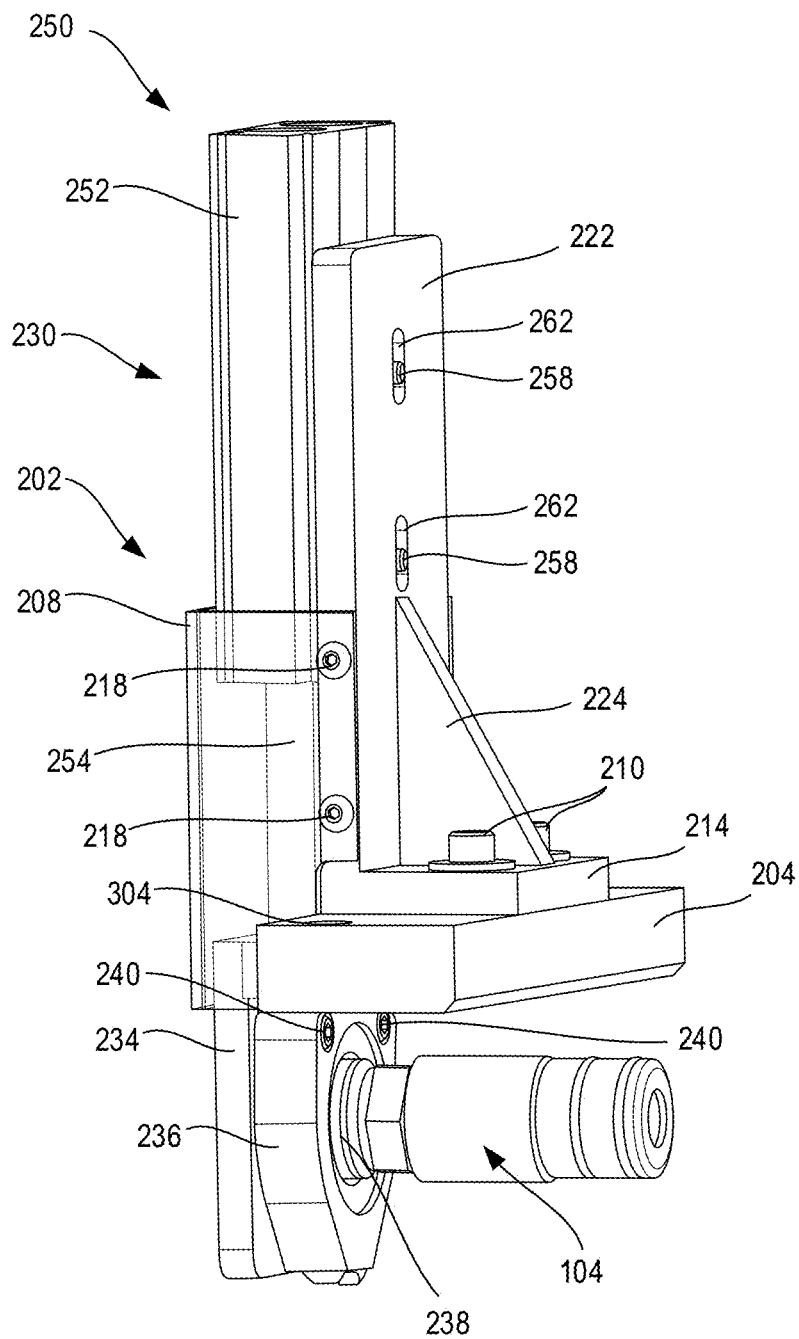
FIG. 5 illustrates the HFSA of FIG. 2 with an arm assembly in an extended configuration and a seal in an engaged configuration with a plunger, according to at least one aspect of the present disclosure.

Once actuated, the arm assembly actuator 250 can actuate and move the arm assembly 232 towards the extended position. In the extended position, as shown in FIG. 5, the arm assembly 232 can be positioned such that the seal 238 is aligned, or at least substantially aligned, with the plunger 104. In the extended position, the seal actuator 236 can be actuated to transition the seal 238 to the engaged configuration. In the engaged configuration, the seal 238 extends from the chamber 246 of the seal actuator 236 and engages the open end of the plunger 104, creating a seal between the ambient environment and the internals of the plunger 104 and the welding chamber 102, preserving the sterility of the environment within the welding chamber 102. In one aspect, once the seal 238 has engaged and sealed the plunger 104, the control system can halt helium flow to the welding chamber 102. In one aspect, once the seal 238 has engaged the plunger 104, a user can manually halt helium flow to the welding chamber 102, such as with a shutoff valve.

In one aspect, the HFSA 200 can maintain the seal between the welding chamber 102 and the ambient environment until another fuel rod is staged for the welding process. In one aspect, a sensor of the control system can detect when a fuel rod is passed through the chuck 108 of the seal weld chamber assembly 100. Once detected via the sensor, the control system can automatically transmit a control signal that actuates the HFSA 200 by transitioning the seal 238 to the disengaged configuration and moving the arm assembly 232 to the retracted position, allowing the fuel rod to enter the welding chamber 102 via the plunger 104. In one aspect, the control system can recommence helium flow to the welding chamber, based on the sensor detecting the fuel rod passing through the chuck 108. In various embodiments, the helium supply can be manually recommenced by a user input, such as opening the shutoff valve that connects the welding chamber 102 to the helium supply. In various embodiments, the HFSA 200 can be manually actuated to transition the seal 238 to the disengaged configuration and move the arm assembly 232 to the retracted position after the flow of helium has recommenced to the welding chamber.

The above-provided HFSA 200 provides a way to preserve a scarce, costly resource without diminishing the integrity and sterility of the welding chamber 102. The HFSA 200 can be operated manually or automatically and can be easily mounted to existing equipment in which limited space is available between the chuck 108 and the entrance to the plunger 104. The HFSA 200 is removably coupleable to the seal weld chamber assembly 100 such that one HFSA 200 can be utilized between a plurality of seal weld chamber assemblies 100, as well as can be easily removed and replaced should the HFSA 200 need repaired or replaced. The simplistic design renders a low-cost solution with potential large savings in the consumption of helium to the seal weld chamber assembly 100.

Various aspects of the subject matter described herein are set out in the following examples.

Example 1—An assembly configured to seal an end plug on a plugged end of a fuel tube, wherein the assembly comprises a seal weld chamber assembly and a helium flow stop assembly (HFSA) removably coupled to the seal weld chamber assembly. The seal weld chamber assembly comprises a welding chamber and a plunger fluidically coupled to the welding chamber. A helium source is configured to supply helium to the welding chamber. The end plug of the fuel tube is positionable within the welding chamber via the plunger. The HFSA is configured to prevent helium from escaping the welding chamber through the plunger.

Example 2—The assembly of Example 1, wherein the HFSA comprises a housing configured to removably couple to the seal weld chamber assembly and a sealing assembly configured to seal the plunger.

Example 3—The assembly of Example 2, wherein the sealing assembly comprises an arm assembly comprising a plate, a seal actuator coupled to the plate, and a seal coupled to the seal actuator.

Example 4—The assembly of Example 3, wherein the seal is configurable between an engaged configuration, wherein the seal engages the plunger, and a disengaged configuration, wherein the seal is disengaged from the plunger, wherein the seal actuator drives the seal toward the engaged configuration.

Example 5—The assembly of Examples 3 or 4, wherein the seal actuator comprises a pneumatic actuator.

Example 6—The assembly of any one of Examples 3-5, wherein the sealing assembly further comprises an arm assembly actuator configured to drive the arm assembly between a retracted position, wherein the seal is positioned within the housing, and an extended position, wherein the seal is substantially aligned with the plunger.

Example 7—The assembly of Example 6, wherein the arm assembly actuator comprises a pneumatic actuator.

Example 8—An assembly configured to seal an end plug on a plugged end of a fuel tube, the assembly comprising a seal weld chamber assembly and a helium flow stop assembly (HFSA). The seal weld chamber assembly comprises a welding chamber and a plunger fluidically coupled to the welding chamber. A helium source is configured to provide helium to the welding chamber. The end plug of the fuel tube is positionable within the welding chamber via the plunger. The HFSA comprises a housing removably coupled to the seal weld chamber assembly and a sealing assembly coupled to the housing, wherein the sealing assembly is configured to seal the plunger to inhibit ambient atmosphere from entering the welding chamber via the plunger.

Example 9—The assembly of Example 8, wherein the sealing assembly comprises an arm assembly comprising a plate, a seal actuator coupled to the plate, and a seal coupled to the seal actuator.

Example 10—The assembly of Example 9, wherein the seal is configurable between a sealing configuration, wherein the seal seals the plunger, and a disengaged configuration, wherein the seal is disengaged from the plunger, wherein the seal actuator drives the seal between toward the sealed configuration.

Example 11—The assembly of Examples 9 or 10, wherein the seal actuator comprises a pneumatic actuator.

Example 12—The assembly of any one of Examples 9-11, wherein the sealing assembly further comprises an arm assembly actuator configured to drive the arm assembly between a retracted position, wherein the seal is positioned within the housing, and an extended position, wherein the seal is substantially aligned with the plunger.

Example 13—The assembly of Example 12, wherein the arm assembly actuator comprises a pneumatic actuator.

Example 14—The assembly of any one of Examples 8-13, wherein the seal weld chamber assembly further comprises a chuck configured to hold the fuel tube when the end plug is positioned within the welding chamber, and wherein the HFSA is coupleable to the seal weld chamber assembly between the welding chamber and the chuck.

Example 15—A helium flow stop assembly (HFSA) usable with a seal weld chamber assembly, wherein the seal weld chamber assembly comprises a welding chamber, a helium supply configured to supply helium to the welding chamber, and a plunger fluidically coupled to the welding chamber, wherein the HFSA comprises a housing configured to removably couple to the seal weld chamber assembly, an arm assembly coupled to the housing, wherein the arm assembly comprises a seal configured to engage the plunger, and an arm assembly actuator configured to move the seal relative to the housing.

Example 16—The HFSA of Example 15, wherein the arm assembly further comprises a plate coupled to the arm assembly actuator and a seal actuator coupled to the plate and the seal.

Example 17—The HFSA of Example 16, wherein the seal is configurable between a first configuration, wherein the seal engages the plunger, and a second configuration, wherein the seal is disengaged from the plunger, wherein the seal actuator drives the seal toward the first configuration.

Example 18—The HFSA of Examples 16 or 17, wherein the seal actuator comprises a pneumatic actuator.

Example 19—The HFSA of any one of Examples 15-18, wherein the arm assembly actuator is configured to move the arm assembly between a retracted position, wherein the seal is positioned within the housing, and an extended position, wherein the seal is substantially aligned with the plunger.

Example 20—The HFSA of any one of Examples 15-19, wherein the arm assembly actuator comprises a pneumatic actuator.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. An assembly configured to seal an end plug on a plugged end of a fuel tube, wherein the assembly comprises:
   a seal weld chamber assembly, comprising:
      a welding chamber, wherein a helium source is configured to supply helium to the welding chamber; and
      a plunger fluidically coupled to the welding chamber, wherein the end plug of the fuel tube is positionable within the welding chamber via the plunger; and
   a helium flow stop assembly (HFSA) removably coupled to the seal weld chamber assembly, wherein the HFSA is configured to prevent helium from escaping the welding chamber through the plunger.

2. The assembly of claim 1, wherein the HFSA comprises:
   a housing configured to removably couple to the seal weld chamber assembly; and
   a sealing assembly configured to seal the plunger.

3. The assembly of claim 2, wherein the sealing assembly comprises an arm assembly, comprising:
   a plate;
   a seal actuator coupled to the plate; and
   a seal coupled to the seal actuator.

4. The assembly of claim 3, wherein the sealing assembly further comprises an arm assembly actuator configured to drive the arm assembly between:
- a retracted position, wherein the seal is positioned within the housing; and
- an extended position, wherein the seal is substantially aligned with the plunger.

5. The assembly of claim 4, wherein the arm assembly actuator comprises a pneumatic actuator.

6. The assembly of claim 3, wherein the seal is configurable between:
- an engaged configuration, wherein the seal engages the plunger; and
- a disengaged configuration, wherein the seal is disengaged from the plunger;
- wherein the seal actuator drives the seal toward the engaged configuration.

7. The assembly of claim 3, wherein the seal actuator comprises a pneumatic actuator.

8. An assembly configured to seal an end plug on a plugged end of a fuel tube, the assembly comprising:
- a seal weld chamber assembly, comprising:
  - a welding chamber, wherein a helium source is configured to provide helium to the welding chamber; and
  - a plunger fluidically coupled to the welding chamber, wherein the end plug of the fuel tube is positionable within the welding chamber via the plunger; and
- a helium flow stop assembly (HFSA), comprising:
  - a housing removably coupled to the seal weld chamber assembly; and
  - a sealing assembly coupled to the housing, wherein the sealing assembly is configured to seal the plunger to inhibit ambient atmosphere from entering the welding chamber via the plunger.

9. The assembly of claim 8, wherein the sealing assembly comprises an arm assembly, comprising:
- a plate;
- a seal actuator coupled to the plate; and
- a seal coupled to the seal actuator.

10. The assembly of claim 9, wherein the sealing assembly further comprises an arm assembly actuator configured to drive the arm assembly between:
- a retracted position, wherein the seal is positioned within the housing; and
- an extended position, wherein the seal is substantially aligned with the plunger.

11. The assembly of claim 10, wherein the arm assembly actuator comprises a pneumatic actuator.

12. The assembly of claim 9, wherein the seal is configurable between:
- a sealing configuration, wherein the seal seals the plunger; and
- a disengaged configuration, wherein the seal is disengaged from the plunger;
- wherein the seal actuator drives the seal between toward the sealed configuration.

13. The assembly of claim 9, wherein the seal actuator comprises a pneumatic actuator.

14. The assembly of claim 8, wherein the seal weld chamber assembly further comprises a chuck configured to hold the fuel tube when the end plug is positioned within the welding chamber, and wherein the HFSA is coupleable to the seal weld chamber assembly between the welding chamber and the chuck.

15. A helium flow stop assembly (HFSA) usable with a seal weld chamber assembly, wherein the seal weld chamber assembly comprises a welding chamber, a helium supply configured to supply helium to the welding chamber, and a plunger fluidically coupled to the welding chamber, wherein the HFSA comprises:
- a housing configured to removably couple to the seal weld chamber assembly;
- an arm assembly coupled to the housing, wherein the arm assembly comprises a seal configured to engage the plunger; and
- an arm assembly actuator configured to move the seal relative to the housing.

16. The HFSA of claim 15, wherein the arm assembly further comprises:
- a plate coupled to the arm assembly actuator; and
- a seal actuator coupled to the plate and the seal.

17. The HFSA of claim 16, wherein the seal is configurable between:
- a first configuration, wherein the seal engages the plunger; and
- a second configuration, wherein the seal is disengaged from the plunger;
- wherein the seal actuator drives the seal toward the first configuration.

18. The HFSA of claim 16, wherein the seal actuator comprises a pneumatic actuator.

19. The HFSA of claim 15, wherein the arm assembly actuator is configured to move the arm assembly between:
- a retracted position, wherein the seal is positioned within the housing; and
- an extended position, wherein the seal is substantially aligned with the plunger.

20. The HFSA of claim 15, wherein the arm assembly actuator comprises a pneumatic actuator.

* * * * *